United States Patent
Cecur

(10) Patent No.: US 10,669,901 B2
(45) Date of Patent: Jun. 2, 2020

(54) ROCKER ARM ASSEMBLY FOR ENGINE BRAKE

(71) Applicant: EATON INTELLIGENT POWER LIMITED, Dublin (IE)

(72) Inventor: Majo Cecur, Rivarolo Canavese (IT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 15 days.

(21) Appl. No.: 15/767,690

(22) PCT Filed: Oct. 17, 2016

(86) PCT No.: PCT/IB2016/056236
§ 371 (c)(1),
(2) Date: Apr. 12, 2018

(87) PCT Pub. No.: WO2017/064690
PCT Pub. Date: Apr. 20, 2017

(65) Prior Publication Data
US 2018/0298795 A1    Oct. 18, 2018

Related U.S. Application Data

(60) Provisional application No. 62/268,690, filed on Dec. 17, 2015, provisional application No. 62/242,102, filed on Oct. 15, 2015.

(51) Int. Cl.
*F01L 13/00*      (2006.01)
*F01L 13/06*      (2006.01)
*F02D 13/02*      (2006.01)

(52) U.S. Cl.
CPC ........... *F01L 13/0031* (2013.01); *F01L 13/06* (2013.01); *F02D 13/0269* (2013.01); *F01L 2013/0089* (2013.01); *Y02T 10/142* (2013.01)

(58) Field of Classification Search
CPC ............... F01L 13/0031; F01L 13/06; F01L 2013/0089; F02D 13/0269; Y02T 10/142
See application file for complete search history.

(56) References Cited

U.S. PATENT DOCUMENTS 4,111,165 A * 9/1978 Aoyama ................. F01L 9/025
                                                123/90.15
4,114,643 A * 9/1978 Aoyama ............. F01L 13/0031
                                                123/321

(Continued)

FOREIGN PATENT DOCUMENTS

GB    2536927 A * 10/2016 .............. F01L 13/06
WO   WO 9325803 A1   12/1993

*Primary Examiner* — Joseph J Dallo
(74) *Attorney, Agent, or Firm* — Leydig, Voit & Mayer, Ltd.

(57) ABSTRACT

A rocker arm assembly for use in a valve train carrier, the rocker arm assembly being rotatable around a rocker shaft supported by the valve train carrier based upon a lift profile provided on a cam that rotates with a camshaft, a rotation of the rocker arm assembly causing translation of a corresponding engine valve, includes: a rocker arm body having an opening that receives the rocker shaft, the rocker arm body further defining an oil supply channel; a capsule assembly disposed on the rocker arm body and that selectively communicates oil to and from the oil supply channel, the capsule assembly including: a plunger assembly having a plunger that selectively translates within a plunger chamber between an extended rigid position based upon the plunger chamber being pressurized with oil and a retracted non-rigid position based upon the plunger chamber being depressurized, the plunger moving move the engine valve.

24 Claims, 16 Drawing Sheets

(56) References Cited

U.S. PATENT DOCUMENTS

| | | | | |
|---|---|---|---|---|
| 4,917,056 | A * | 4/1990 | Yagi | F01L 1/143 123/198 F |
| 5,647,319 | A * | 7/1997 | Uehara | F01L 13/06 123/322 |
| 5,655,499 | A * | 8/1997 | Uehara | F01L 13/06 123/321 |
| 6,000,374 | A | 12/1999 | Cosma | |
| 6,253,730 | B1 | 7/2001 | Gustafson | |
| 6,439,195 | B1 * | 8/2002 | Warner | F01L 13/06 123/320 |
| 2002/0174654 | A1 * | 11/2002 | Yang | F01L 13/06 60/602 |
| 2002/0174849 | A1 * | 11/2002 | Ruggiero | F01L 13/06 123/319 |
| 2006/0037578 | A1 * | 2/2006 | Nakamura | F01L 1/185 123/198 F |
| 2007/0277510 | A1 * | 12/2007 | McClure | F01L 1/34 60/295 |
| 2010/0037854 | A1 * | 2/2010 | Yang | F02D 13/04 123/321 |
| 2012/0186546 | A1 * | 7/2012 | Cecur | F01L 1/146 123/90.15 |
| 2012/0210964 | A1 | 8/2012 | Barnes | |
| 2015/0122220 | A1 * | 5/2015 | Cecur | F01L 1/24 123/321 |
| 2015/0267575 | A1 * | 9/2015 | Nakamura | F01L 13/0031 123/90.16 |
| 2019/0107011 | A1 * | 4/2019 | Contarin | F01L 1/181 |
| 2019/0145288 | A1 * | 5/2019 | VanWingerden | F01L 1/18 |

* cited by examiner

ROCKER ARM ASSEMBLY FOR ENGINE BRAKE

CROSS-REFERENCE TO RELATED APPLICATIONS

This application is a U.S. National Phase application under 35 U.S.C. § 371 of International Application No. PCT/IB2016/056236, filed on Oct. 17, 2016, and claims benefit to U.S. Provisional Patent Application No. 62/242,102, filed on Oct. 15, 2015, and U.S. Provisional Patent Application No. 62/268,690, filed on Dec. 17, 2015. The International Application was published in English on Apr. 20, 2017 as WO 2017/064690 under PCT Article 21(2).

FIELD

The present disclosure relates generally to a rocker arm configuration for use in a valve train assembly and more particularly to a rocker arm assembly having a capsule assembly used as a reset function to alter a valve lift profile.

BACKGROUND

Compression engine brakes can be used as auxiliary brakes, in addition to wheel brakes, on relatively large vehicles, for example trucks, powered by heavy or medium duty diesel engines. A compression engine braking system is arranged, when activated, to provide an additional opening of an engine cylinder's exhaust valve when the piston in that cylinder is near a top-dead-center position of its compression stroke so that compressed air can be released through the exhaust valve. This causes the engine to function as a power consuming air compressor which slows the vehicle.

In a typical valve train assembly used with a compression engine brake, the exhaust valve is actuated by a rocker arm which engages the exhaust valve by means of a valve bridge. The rocker arm rocks in response to a cam on a rotating cam shaft and presses down on the exhaust valve to open it. In some examples a valve bridge may be provided between the rocker arm and a pair of exhaust valves. A hydraulic lash adjuster may also be provided in the valve train assembly to remove any lash or gap that develops between the components in the valve train assembly.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In an embodiment, the present invention provides a rocker arm assembly configured for use in a valve train carrier, the rocker arm assembly being rotatable around a rocker shaft supported by the valve train carrier based upon a lift profile provided on a cam that rotates with a camshaft, a rotation of the rocker arm assembly causing translation of a corresponding engine valve, the rocker arm assembly comprising: a rocker arm body having an opening that receives the rocker shaft, the rocker arm body further defining an oil supply channel; a capsule assembly disposed on the rocker arm body and configured to selectively communicate oil to and from the oil supply channel, the capsule assembly comprising: a plunger assembly having a plunger configured to selectively translate within a plunger chamber between an extended rigid position based upon the plunger chamber being pressurized with oil and a retracted non-rigid position based upon the plunger chamber being depressurized, the plunger being configured to move the engine valve toward an open position; and a shuttle assembly configured to move between a first position and a second position based upon oil communicated in the oil supply channel, the shuttle assembly having a shuttle valve configured to selectively move between a closed position and an open position, wherein in the open position oil flows into the plunger chamber, and wherein the rocker arm assembly is configured to sequentially move along a (i) a first valve lift profile wherein pressurized oil is communicated from the oil supply channel, the shuttle assembly being configured to move into the second position causing the shuttle valve to be opened, the pressure chamber to be pressurized, and the plunger to move to the extended rigid position, (ii) a reset valve lift profile wherein pressurized oil is not communicated from the oil supply channel, the shuttle assembly being configured to move into the first position, and (iii) a valve closing profile.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
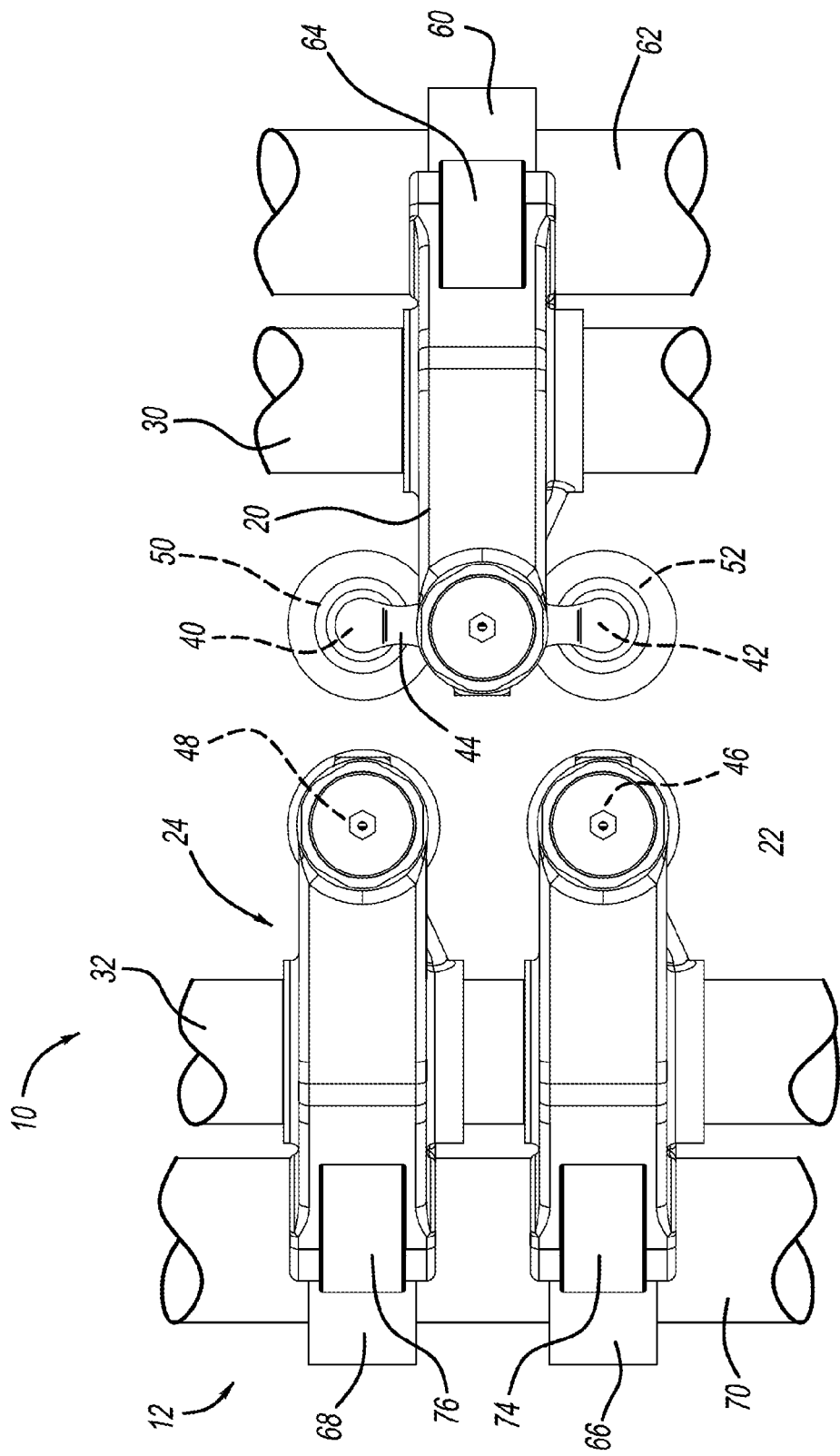
FIG. 1 is a top view of a partial valve train assembly incorporating two dedicated exhaust rocker arms configured for opening and closing respective exhaust valves and a single intake rocker arm for opening and closing respective intake valves through a bridge according to one example of the present disclosure.

A rocker arm assembly configured for use in a valve train carrier constructed in accordance to one example to the present disclosure includes a rocker arm body and a capsule assembly. The rocker arm assembly is rotatable around a rocker shaft supported by the valve train carrier based upon a lift profile provided on a cam that rotates with a camshaft. The rotation of the rocker arm assembly causes translation of a corresponding engine valve. The rocker arm body has an opening that receives the rocker shaft. The rocker arm body further defines an oil supply channel. The capsule assembly is disposed on the rocker arm body and is configured to selectively communicate oil to and from the oil supply channel. The capsule assembly comprises a plunger assembly and a shuttle assembly. The plunger assembly has a plunger that selectively translates within a plunger chamber between an extended rigid position based upon the plunger chamber being pressurized with oil and a retracted non-rigid position based upon the plunger chamber being depressurized. The plunger moves the engine valve toward an open position. The shuttle assembly moves between a first position and a second position based upon oil communicated in the oil supply channel. The shuttle assembly has a shuttle valve that selectively moves between a closed position and an open position, in the open position oil flows into the plunger chamber. The rocker arm assembly sequentially moves along a first valve lift profile, a reset valve lift profile and a valve closing profile. In the first valve lift profile, pressurized oil is communicated from the oil supply channel. The shuttle assembly moves into the second position causing the shuttle valve to be opened. The pressure chamber is pressurized and the plunger moves to the extended rigid position. In the reset valve lift profile, pressurized oil is not communicated from the oil supply channel and the shuttle assembly moves into the first position.

According to additional features, the shuttle assembly moves into the second position based on the oil supply channel of the rocker arm being aligned with an actuation oil supply channel on the rocker shaft. The shuttle assembly moves into the first position based on the oil supply channel of the rocker arm body being aligned with a reset discharge channel on the rocker shaft. In one configuration, the rocker arm assembly is an exhaust rocker arm assembly and the first valve lift profile includes de-compression engine brake.

According to other features, the engine valve is an exhaust engine valve. The exhaust engine valve moves through an exhaust gas recirculation, almost closes and moves through a compression release along the first valve lift profile. The valve closing profile corresponds to a standard exhaust valve closing profile.

According to other configurations, the rocker arm assembly is an exhaust rocker arm assembly wherein the first valve lift profile includes early exhaust valve opening. According to other arrangements, the rocker arm assembly is an intake rocker arm assembly wherein the third valve lift profile includes early intake valve closing. The plunger assembly can include a plunger biasing member that biases the plunger toward the extended rigid position. The plunger biasing member can be a coil spring. The plunger assembly can further include a guide rod positioned axially within the plunger biasing member. The shuttle valve can further comprise a shuttle body having an upstream and a downstream shuttle port, a ball and a ball biasing member. The ball seats against the upstream shuttle port in the closed position. During the first valve lift profile, the ball moves away from the upstream shuttle port to an unseated position fluidly connecting the upstream shuttle port and the downstream shuttle port.

According to still other features, the capsule assembly comprises a capsule housing received by the rocker arm body. The capsule housing defines a plunger chamber, a shuttle chamber and a connecting port that fluidly connects the plunger chamber and the shuttle chamber. During the first valve lift profile oil is communicated through the upstream shuttle port, downstream shuttle port and the connecting port to fill the plunger chamber.

A rocker arm assembly configured for use in a valve train carrier according to another example of the present disclosure includes a first exhaust rocker arm assembly and a second exhaust rocker arm assembly. The first exhaust rocker arm assembly is rotatable around a rocker shaft supported by the valve train carrier based upon a first lift profile provided on a first cam that rotates with a camshaft. The rotation of the first exhaust rocker arm assembly causes translation of a corresponding first engine exhaust valve. The first exhaust rocker arm assembly comprises a first rocker arm body having a first capsule assembly that moves through a first reset function that changes a lift profile of the first engine exhaust valve. The second exhaust rocker arm assembly is rotatable around the rocker shaft based upon a second lift profile provided on a second cam that rotates with the camshaft. The rotation of the second exhaust rocker arm assembly causes translation of a corresponding second engine exhaust valve. The second exhaust rocker arm assembly comprising a second rocker arm body having a second capsule assembly that moves through a second reset function that changes a lift profile of the second engine exhaust valve. The first exhaust rocker arm assembly is configured for de-compression engine brake. The second exhaust rocker arm assembly is configured for early exhaust valve opening.

According to additional features the first and second rocker arm assemblies each comprise a rocker arm body, a plunger assembly and a shuttle assembly. The rocker arm body has an opening that receives the rocker shaft. The rocker arm body further defines an oil supply channel. The plunger assembly has a plunger that selectively translates within a plunger chamber between an extended rigid position based upon the plunger chamber being pressurized with oil and a retracted non-rigid position based upon the plunger chamber being depressurized. The plunger moves the engine valve toward an open position. The shuttle assembly moves between a first position and a second position based upon oil communicated in the oil supply channel. The shuttle assembly has a shuttle valve that selectively moves between a closed position and an open position. In the open position oil flows through a downstream shuttle port and into the plunger chamber.

In other features the first rocker arm assembly sequentially moves along a first valve lift profile, a reset valve lift profile and a valve closing profile. In the first valve lift profile pressurized oil is communicated from the oil supply channel. The shuttle assembly moves into the second position causing the shuttle valve to be opened, the pressure chamber to be pressurized and the plunger to move to the extended rigid position. In the reset valve lift profile pressurized oil is not communicated from the oil supply channel and the shuttle assembly moves into the first position.

According to other features, the shuttle assembly moves into the second position based on the oil supply channel of the respective rocker arm body being aligned with an actuation oil supply channel on the rocker shaft. The shuttle assembly moves into the first position based on the oil supply channel of the respective rocker arm body being aligned with a reset discharge channel on the rocker shaft. The plunger assembly can further include a plunger biasing member that biases the plunger toward the extended rigid position. The shuttle valve can further include a shuttle body having an upstream and a downstream shuttle port, a ball and a ball biasing member. The ball seats against an upstream shuttle port in the closed position. During the first valve lift profile, the ball moves away from the upstream shuttle port to an unseated position fluidly connecting the upstream shuttle port and the downstream shuttle port. The rocker arm assembly can further comprise a capsule assembly having a capsule housing received by the respective rocker arm body. The capsule housing defines a plunger chamber, a shuttle chamber and a connecting port that fluidly connects the plunger chamber and the shuttle chamber.

A rocker arm assembly configured for use in a valve train carrier according to another example of the present disclosure includes a first exhaust rocker arm assembly, a second exhaust rocker arm assembly and an intake rocker arm assembly. The first exhaust rocker arm assembly is rotatable around an exhaust rocker shaft supported by the valve train carrier based upon a first lift profile provided on a first cam that rotates with an exhaust camshaft. The rotation of the first exhaust rocker arm assembly causes translation of a corresponding first engine exhaust valve. The first exhaust rocker arm assembly comprises a first rocker arm body having a first capsule assembly that moves through a first reset function that changes a lift profile of the first engine exhaust valve. The second exhaust rocker arm assembly is rotatable around the exhaust rocker shaft based upon a second lift profile provided on a second cam that rotates with the exhaust camshaft. The rotation of the second exhaust rocker arm assembly causes translation of a corresponding second engine exhaust valve. The second exhaust rocker arm assembly comprises a second rocker arm body having a second capsule assembly that moves through a second reset function that changes a lift profile of the second engine exhaust valve. The intake rocker arm assembly is rotatable around an intake rocker shaft based upon a third lift profile provided on a third cam that rotates with an intake camshaft. The rotation of the first intake rocker arm assembly causes translation of at least one engine intake valve. The intake rocker assembly comprising a third rocker arm body having a third capsule assembly that moves through a third reset function that changes a lift profile of the at least one engine intake valve. The first exhaust rocker arm assembly is configured for de-compression engine brake. The second exhaust rocker arm assembly is configured for early exhaust valve opening. The intake rocker arm is configured for one of early intake valve closing or late intake valve closing.

The present disclosure provides a rocker arm configuration having a capsule assembly that provides a reset function. As will become appreciated herein, a rocker arm can be configured to initially follow a high lift profile and transition to a low lift profile as a result of the reset function. The capsule assembly includes a movable shuttle or spool that is configured to translate and release oil pressure within the capsule at a predetermined release point. The following disclosure sets forth various examples where such rocker arms that incorporate a reset function can be used both on the exhaust side for controlling exhaust valves and on the intake side for controlling intake valves. As described herein, a valve train assembly utilizes various combinations of rocker arms to provide various combinations of variable valve actuation (WA) functions. On the exhaust side, rocker arm configurations are provided for decompression engine braking (EB) and early exhaust valve opening (EEVO). On the intake side, rocker arm configurations are provided for early intake valve closing (EIVC) and late intake valve closing (LIVC). In some examples, a hydraulic lash adjustment (HLA) may be also provided.

In various examples, a first exhaust rocker arm can be configured to control a first exhaust valve for de-compression engine brake while a second exhaust rocker arm can be configured to control a second exhaust valve for early exhaust valve opening. Similarly, a first intake rocker arm can be configured for early intake valve closing or late intake valve closing. It will be appreciated from the following discussion that one, some or all or the rocker arm configurations with a reset function may be incorporated in a valve train depending on the particular application.

Figure 2:
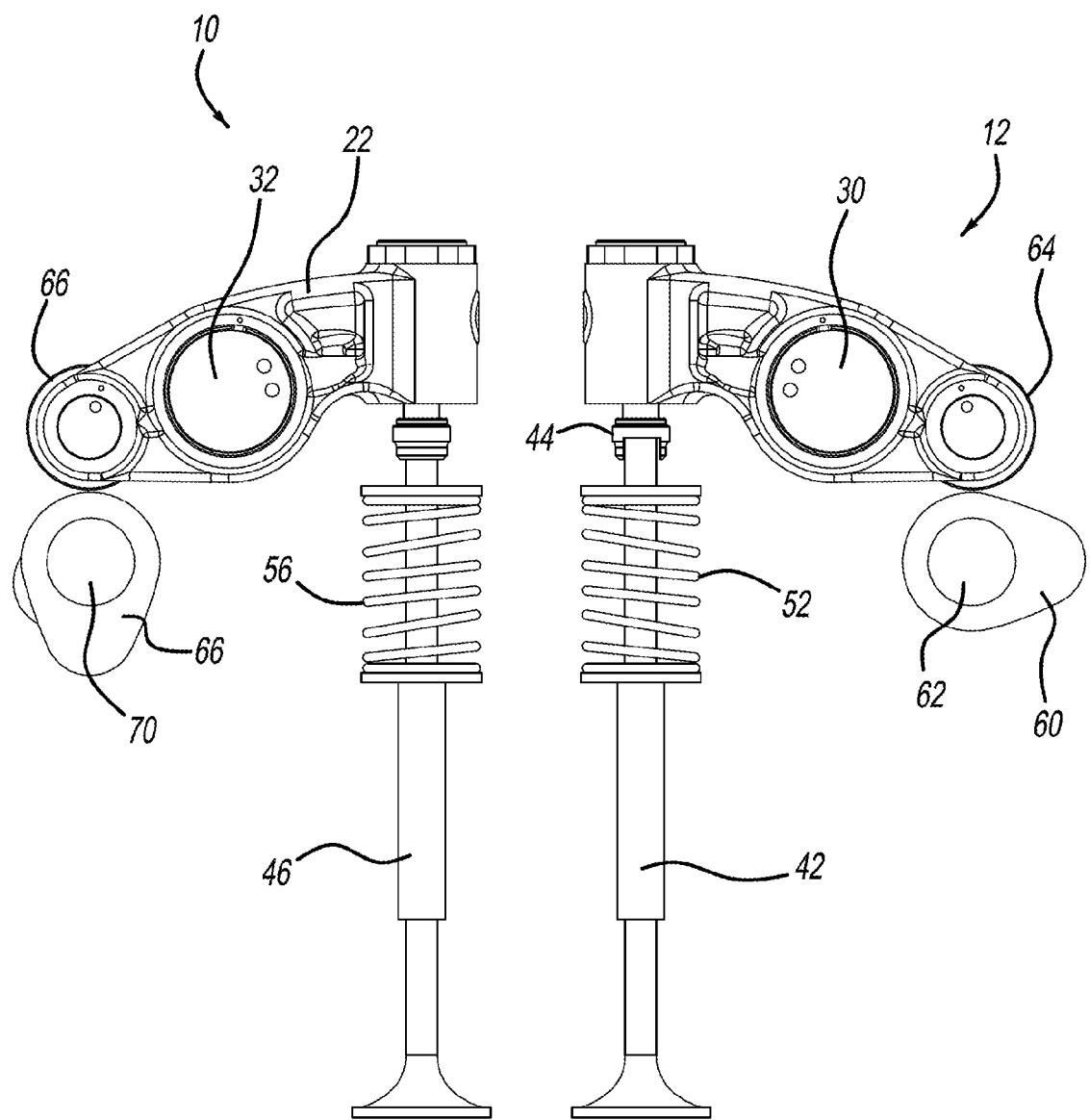
FIG. 2 is a side view of the exhaust valve rocker arm assembly of FIG. 1 and an intake valve rocker arm assembly according to one example of the present disclosure.

With initial reference to FIGS. 1 and 2, a partial valve train assembly constructed in accordance to one example of the present disclosure is shown and generally identified at reference 10. The partial valve train assembly 10 utilizes engine braking and is shown configured for use in a three-cylinder bank portion of a six-cylinder engine. It will be appreciated however that the present teachings are not so limited. In this regard, the present disclosure may be used in any valve train assembly that utilizes engine braking. The partial valve train assembly 10 is supported in a valve train carrier 12 and can include three rocker arms per cylinder.

Specifically, the intake and exhaust valves of each cylinder are opened and closed by an intake valve rocker arm assembly 20, a first exhaust valve rocker arm assembly 22 and a second exhaust valve rocker arm assembly 24. The intake valve rocker arm assembly 20 can be configured for operation along a standard intake valve lift profile, an early intake valve closing lift profile or a late intake valve closing lift profile. The first exhaust valve rocker arm assembly 22 can be configured for operation along a standard exhaust valve lift profile, de-compression engine brake lift profile or early exhaust valve opening lift profile.

An intake rocker shaft 30 is received by the valve train carrier 12 and supports rotation of the intake valve rocker arm assembly 20. An exhaust rocker shaft 32 is received by the valve train carrier 12 and supports rotation of the first and second exhaust rocker arm assemblies 22 and 24. In the example shown, the intake valve rocker arm assembly 20 opens and closes intake valves 40 and 42 through a valve bridge 44. The first exhaust rocker arm assembly 22 opens and closes a first exhaust valve 46. The second exhaust rocker arm assembly 24 opens and closes a second exhaust valve 48. The intake valves 40 and 42 are biased by intake valve springs 50 and 52, respectively. The exhaust valves 46 and 48 are biased by exhaust valve springs 56 and 58, respectively. The intake valve rocker arm assembly 20 rotates around the intake rocker shaft 30 based on a lift profile of an intake cam 60 that rotates with an intake camshaft 62. The intake valve rocker arm assembly 20 has a roller 64 that rotatably engages the intake cam 60.

The first and second exhaust rocker arm assemblies 22 and 24 rotate around the exhaust rocker shaft 32 based on lift profiles of respective exhaust cams 66 and 68 that rotate with an exhaust camshaft 70. The first exhaust rocker arm assembly 22 has a roller 74 that rotatably engages the cam 66. The second exhaust rocker arm assembly 24 has a roller 76 that rotatably engages the cam 68.

Figure 3:
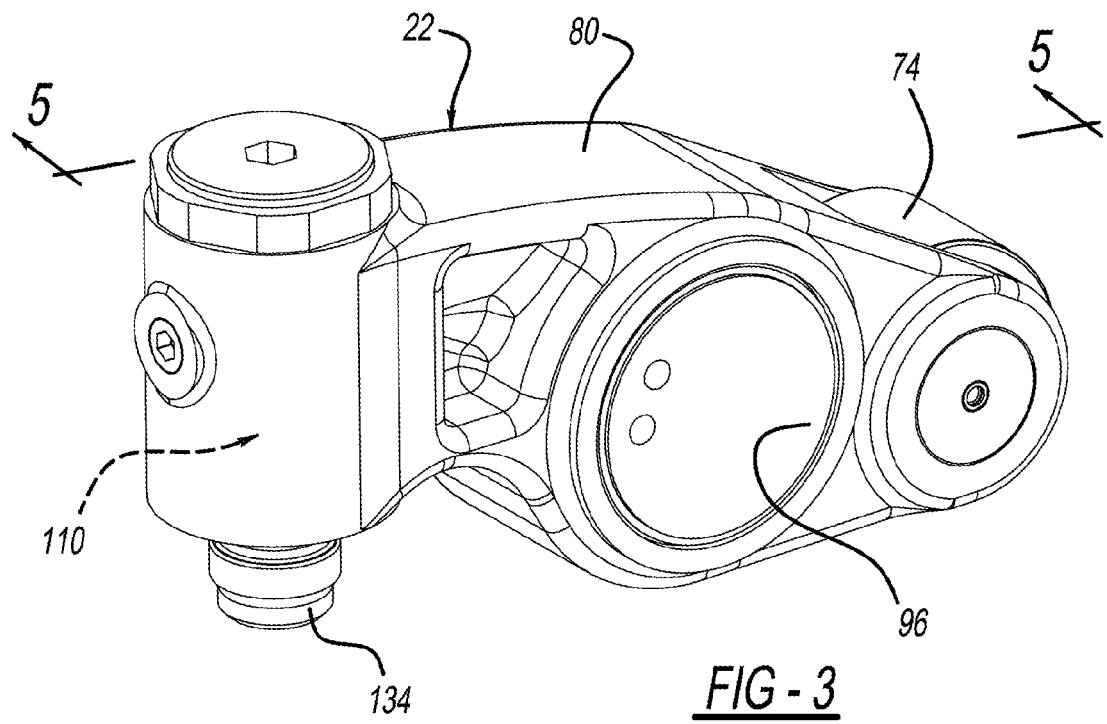
FIG. 3 is a front perspective view of an exhaust valve rocker arm assembly having a capsule assembly and constructed in accordance to one example of the present teachings.
Figure 4:
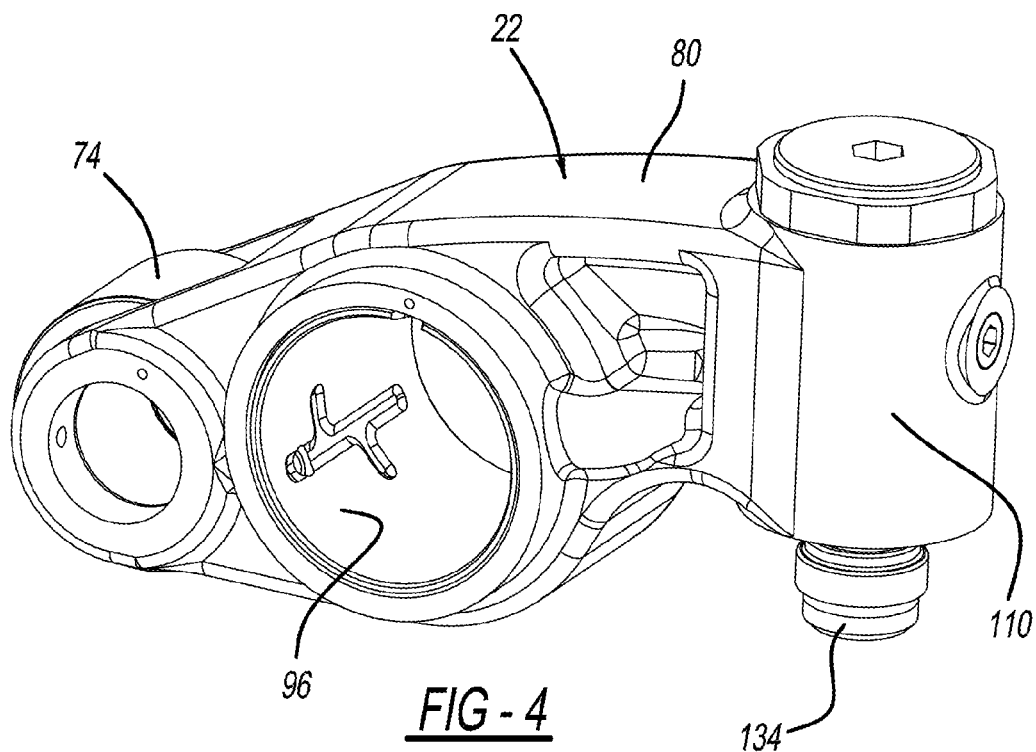
FIG. 4 rear perspective view of the exhaust valve rocker arm assembly of FIG. 3.
Figure 5:
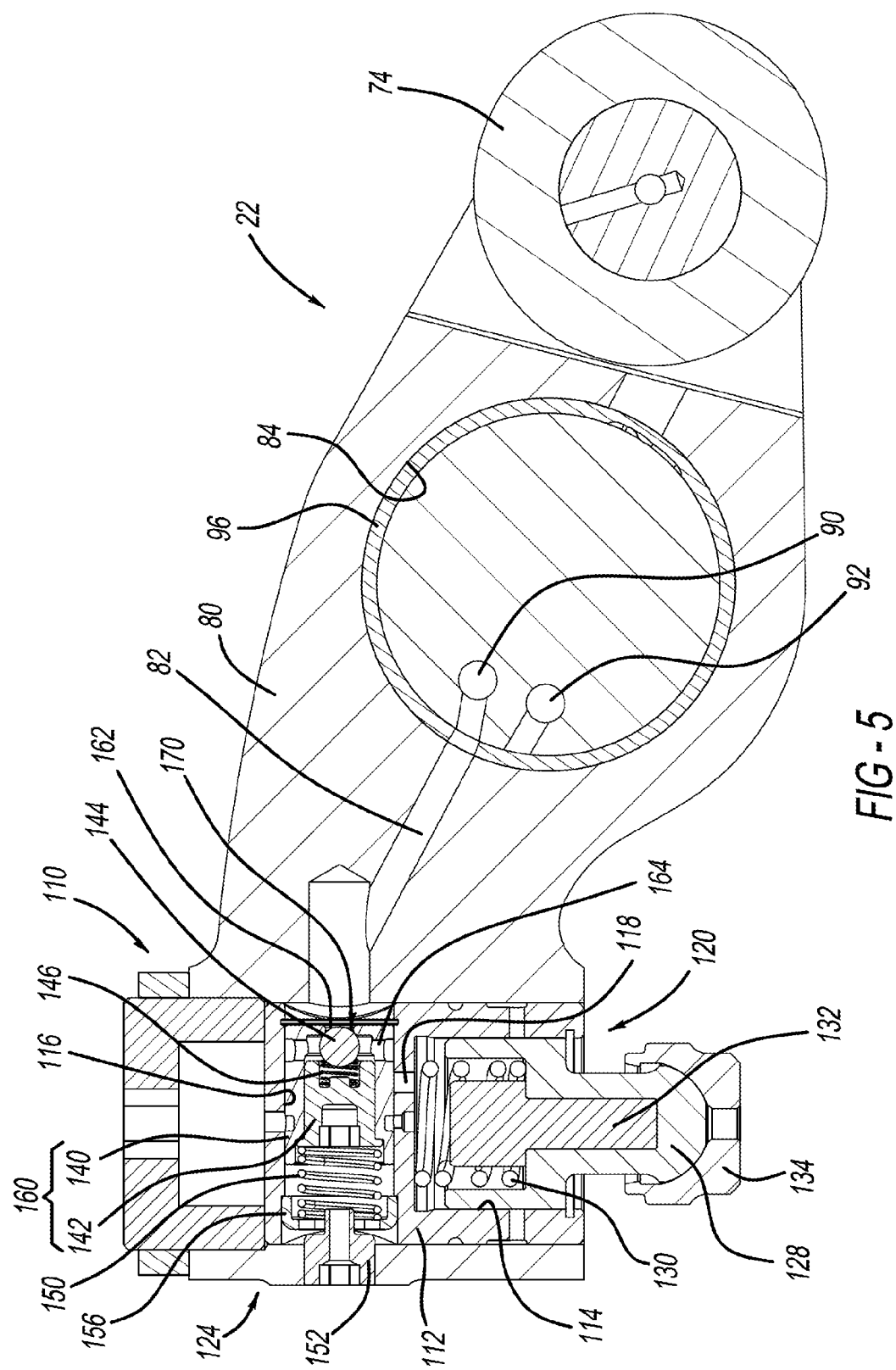
FIG. 5 is a sectional view taken along lines 5-5 of FIG. 3 and shown during drive mode according to one example of the present disclosure.

Turning now to FIGS. 3-5, the first exhaust valve rocker arm assembly 22 will be described in greater detail. It will be appreciated however that the second exhaust valve rocker arm assembly 24 and the intake valve rocker arm assembly 20 can be constructed similarly with reset function capabilities. Again, the first exhaust valve rocker arm assembly 22 rotates around the exhaust rocker shaft 32 based on the lift profile of the exhaust cam 66.

The first exhaust valve rocker arm assembly 22 includes a rocker arm body 80 that defines an oil supply channel 82 (FIG. 5) and an opening 84 that receives the exhaust rocker shaft 32. As will explained herein, the oil supply channel 82 is caused to align with an actuation oil supply channel 90 provided on the exhaust rocker shaft 32 along a first operating condition and align with a reset discharge channel 92 along a second operating condition. A bushing 96 can be arranged between the rocker arm body 80 and the exhaust rocker shaft 32.

The first exhaust valve rocker arm assembly 22 can include a capsule assembly 110 that includes a capsule housing 112 received in the rocker arm body 80. The capsule housing 112 defines a plunger chamber 114, a shuttle chamber 116 and a connecting port 118 that connects the plunger chamber 114 and the shuttle chamber 116. The capsule assembly 110 generally includes a plunger assembly 120 and a shuttle assembly 124. The plunger assembly 120 includes a plunger 128, a plunger biasing member 130, a guide rod 132 and an elephant foot 134. The plunger 128 is slidably received in the plunger chamber 114 and biased outwardly by the plunger biasing member 130. As will become appreciated the plunger 128 is caused to be urged outwardly in a rigid position upon accumulation of oil within the plunger chamber 114.

The shuttle assembly 124 can generally include an outer body 140, an inner body 142, a ball 144, a ball biasing member 146, a shuttle biasing member 150, a pin 152 and a cap or closure member 156. The outer and inner body 140 and 142 are collectively referred to herein as a shuttle body 160. The shuttle body 160 can define an upstream shuttle port 162 and a downstream shuttle port 164. The shuttle body 160, ball 144 and ball biasing member 146 can collectively provide a shuttle valve 170 that selectively allows fluid communication in an open position (with the shuttle assembly 124 translated rightward as viewed in the drawings) between the connecting port 118, upstream shuttle port 162 and downstream shuttle port 164.

Figure 6:
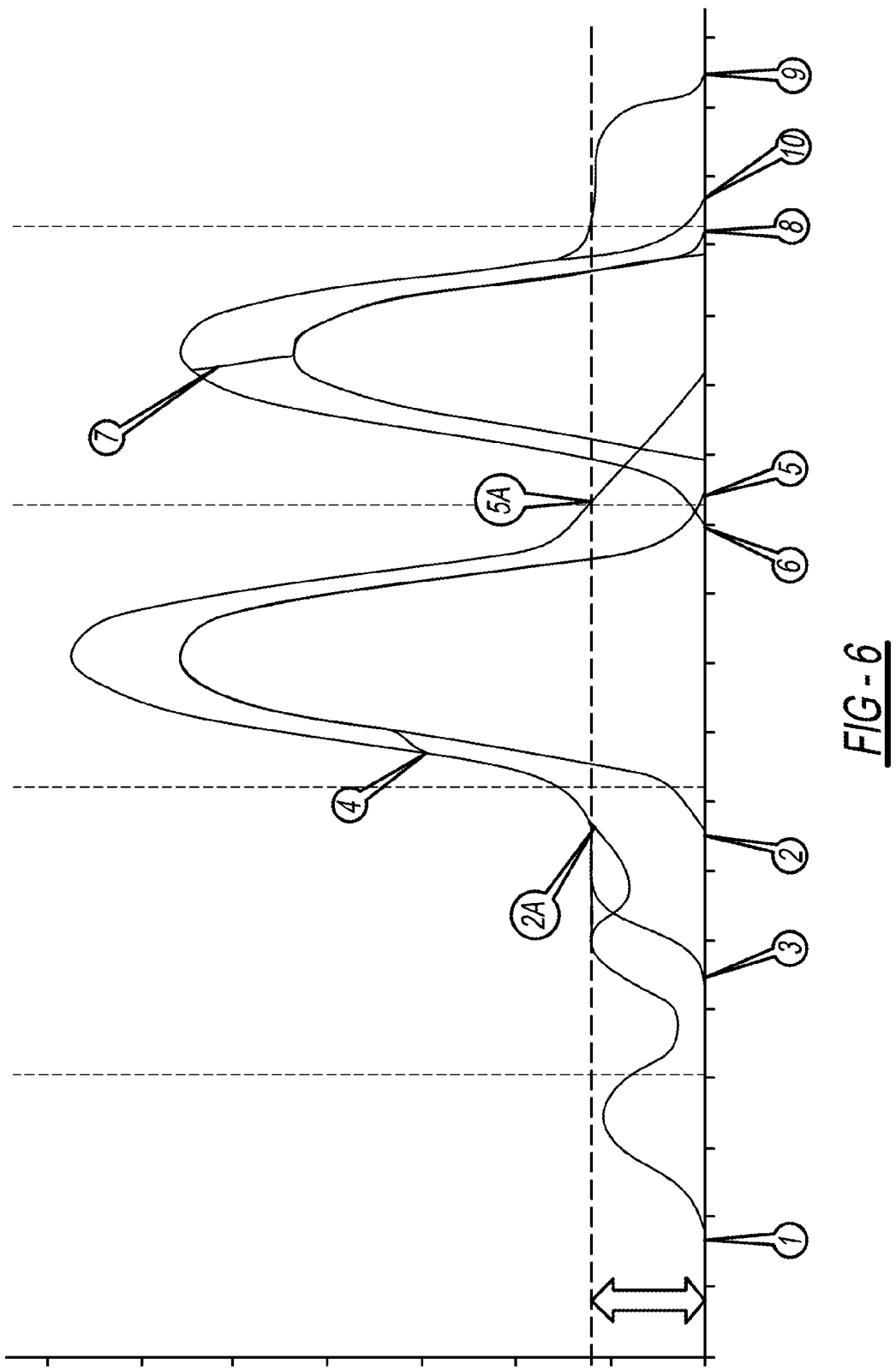
FIG. 6 is a plot showing potential single and combined variable valve lift functions for a dual overhead cam valve train configuration implementing the rocker arm assemblies of the instant disclosure, the variable valve lift options include engine brake, early exhaust valve opening, early intake valve closing and late intake valve closing.

With reference to FIG. 6, possible valve lift profiles on the exhaust side and intake side for a valve train incorporating rocker arm configurations according to the present disclosure are shown compared to a standard exhaust and intake lift profiles, in the example shown in FIG. 6, the x-axis represents degrees of camshaft rotation and the y-axis represents valve lift. The actual values are merely exemplary. In a standard exhaust lift profile the exhaust valves 46 and 48 open at 2A and close at 5A. In standard intake valve lift, one or both intake valves 40 and 42 open at point 6 and close at point 10.

According to one configuration of the present disclosure, the first exhaust valve rocker arm assembly 22 can be configured for de-compression engine brake. In general, the exhaust valve 46 opens at point 1, goes through exhaust gas recirculation, almost closes, goes through compression release and at point 4, goes through a reset function. Subsequent to the reset function, the exhaust valve 46 follows a standard exhaust valve closing profile and closes at point 5. The second exhaust valve rocker arm assembly 24 can be configured for early exhaust valve opening. In general, the exhaust valve 48 opens at point 3, goes through a reset function at point 4 and follows a standard exhaust valve closing profile and closes at point 5, in the examples described two oil control valves can be incorporated for delivering oil to the first exhaust valve rocker arm assembly 22. One oil control valve can be incorporated for delivering oil to the second exhaust valve rocker arm assembly 24.

In addition, the intake valve rocker arm assembly 20 can be configured for early intake valve closing where one or both of the intake valves 40 and 42 are opened at point 6, following opening flank travels close to maximum lift where at point 7, goes through a reset function and closes at point 8. Similarly, the intake rocker arm assembly 20 can be configured for late intake valve closing wherein one or both of the intake valves 40 and 42 are opened at point 6 and follow the late intake valve closing cam lift until closing at point 9. It will be appreciated that in some examples the bridge 44 can cause both intake valves 40 and 42 to move concurrently. In other arrangements, dedicated intake rocker arms may be provided to independently operate the first and second intake valves 40 and 42. Other configurations are contemplated, in the example described one oil control valve can be incorporated for delivering oil to the intake valve rocker arm assembly 20.

Turning now to FIGS. 7-13, operation of the exhaust rocker arm assembly 22 having the reset function in engine brake and drive mode will be described. In drive mode (identified by "FIG. 8" in FIG. 7), the shuttle assembly 124 generally occupies a first position (translated leftward as viewed in FIG. 8) biased by the shuttle biasing member 150. In engine brake mode (identified by "FIG. 9" in FIG. 7), the shuttle assembly 124 translates rightward and occupies a second position, in engine brake mode, pressurized oil is communicated through the oil supply channel 82, causing the shuttle assembly 124 to translate rightward and the shuttle valve 170 to open causing oil to fill the plunger chamber 114 and the plunger to move to an extended rigid position.

In drive mode with lost motion (identified by "FIG. 10" in FIG. 7), the shuttle assembly 124 occupies the first position and the plunger chamber 114 is not pressurized. Therefore, the plunger 128 is permitted to translate against the bias of the plunger biasing member 30.

The reset function will now be described. When the rocker arm assembly 22 continues rotation around the rocker shaft 32, the oil supply channel 82 will initially align with the reset discharge channel 92 (identified by "FIG. 11" in FIG. 7) causing oil to be drained away from the capsule assembly 110 through the oil supply channel and into the reset discharge channel 92. The shuttle assembly 124 is caused to translate leftward, (identified by "FIG. 13" in FIG.

Figure 7:
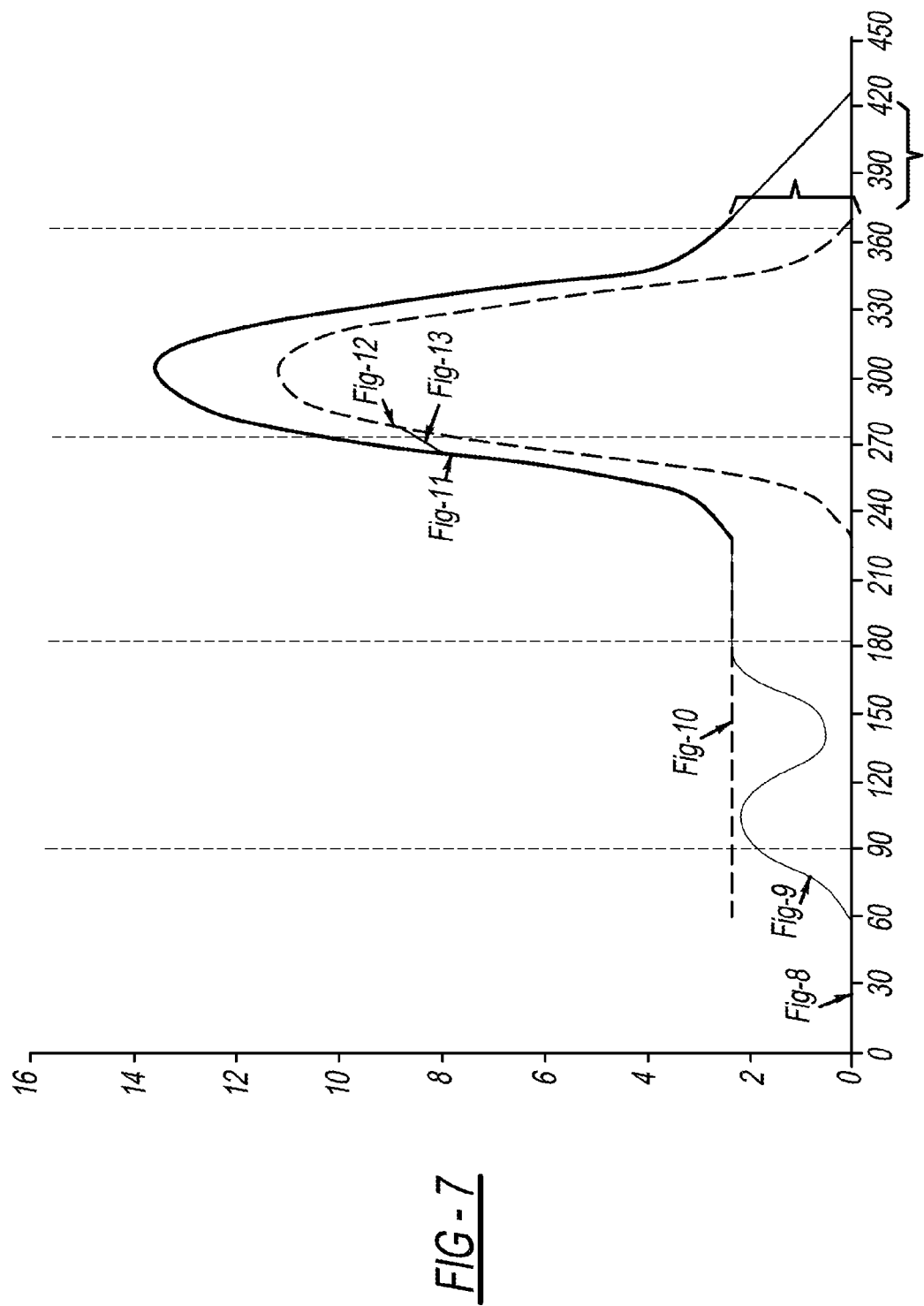
FIG. 7 is a plot showing the reset function in engine brake and drive mode on an exhaust rocker arm assembly constructed in accordance to the present teachings.
Figure 8:
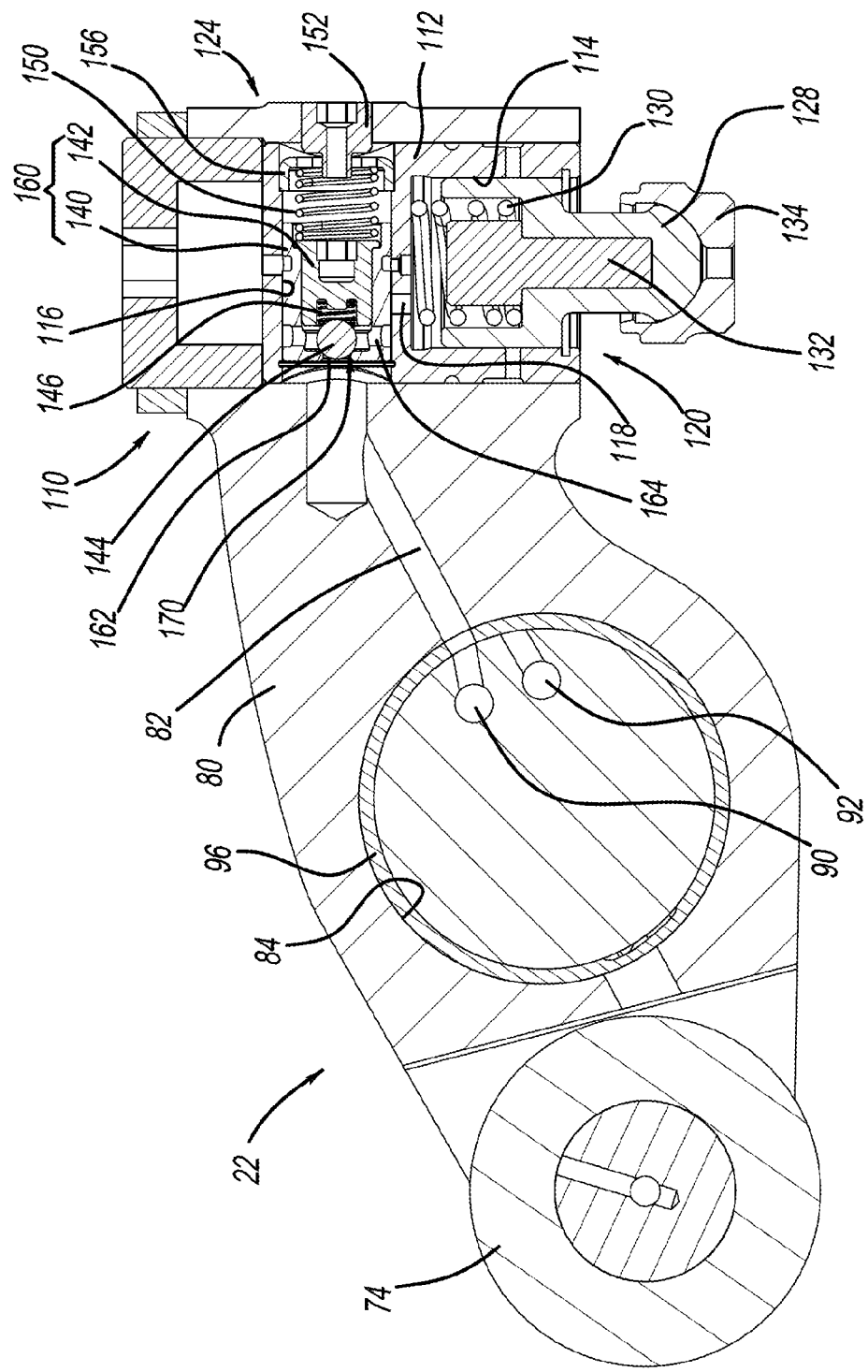
FIG. 8 is a sectional view of a rocker arm assembly constructed in accordance with the present disclosure and shown during a drive mode.
Figure 9:
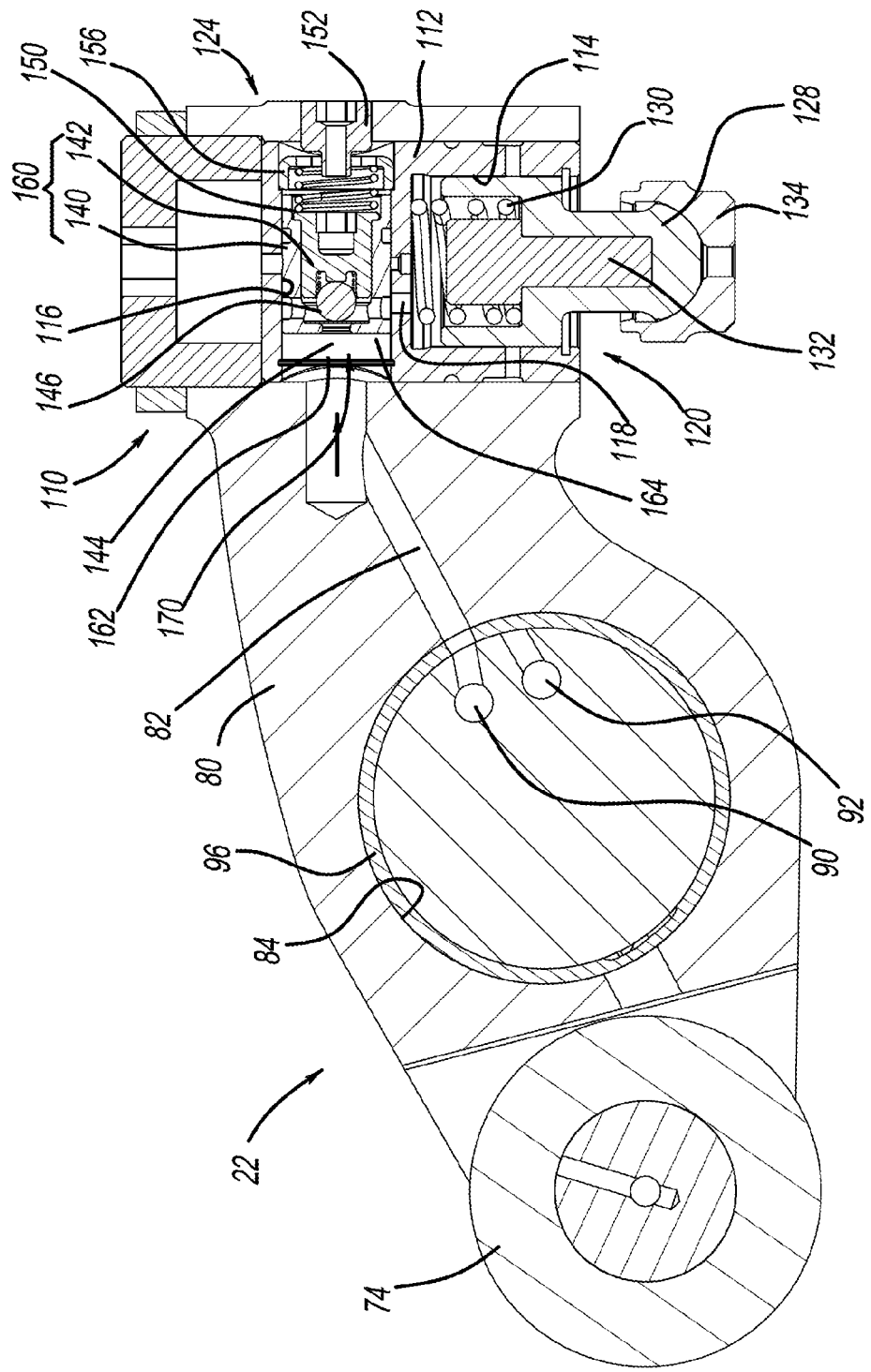
FIG. 9 is a sectional view of a rocker arm assembly constructed in accordance to the present disclosure and shown during engine brake mode.
Figure 10:
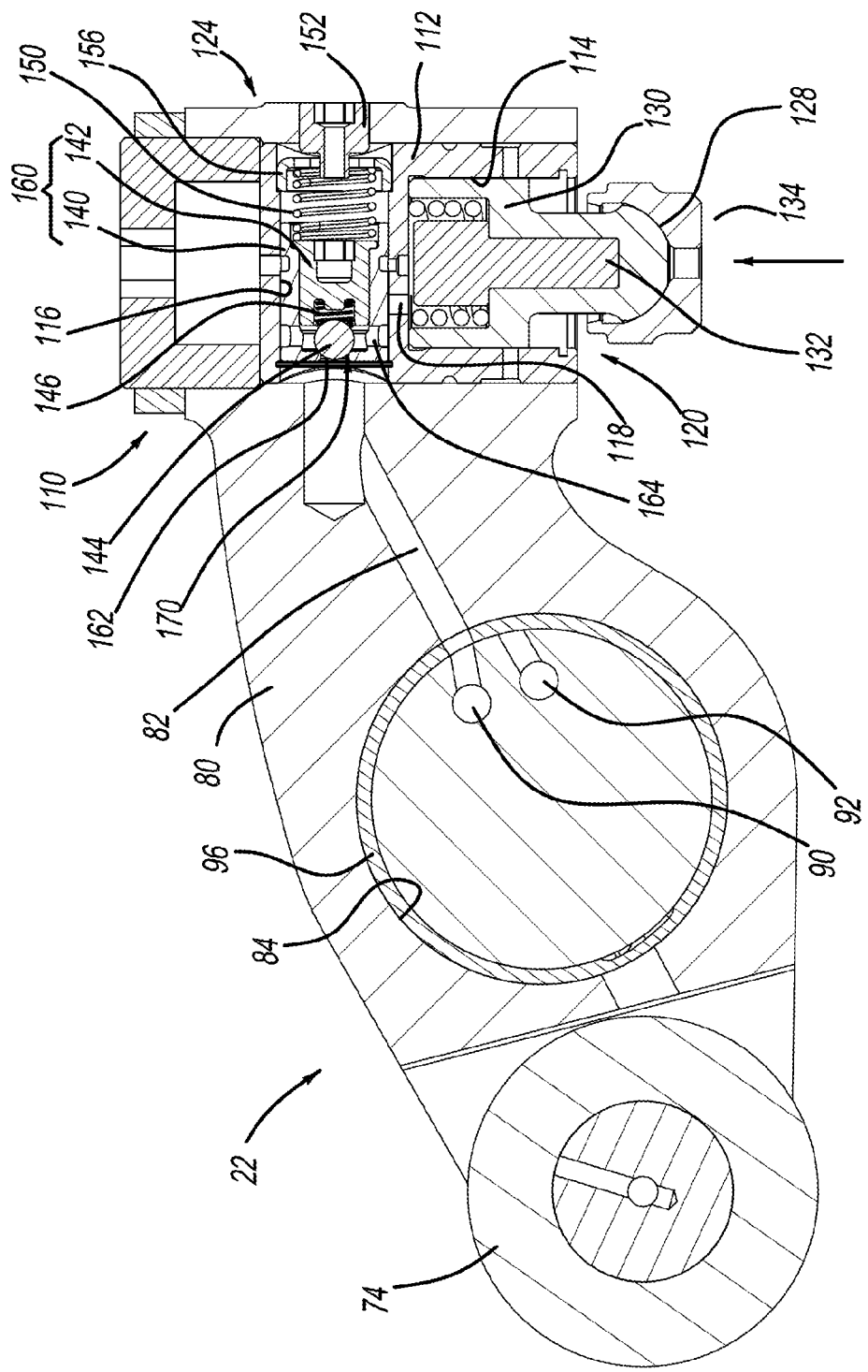
FIG. 10 is a sectional view of a rocker arm assembly constructed in accordance to the present disclosure and shown during drive mode with lost motion.
Figure 11:
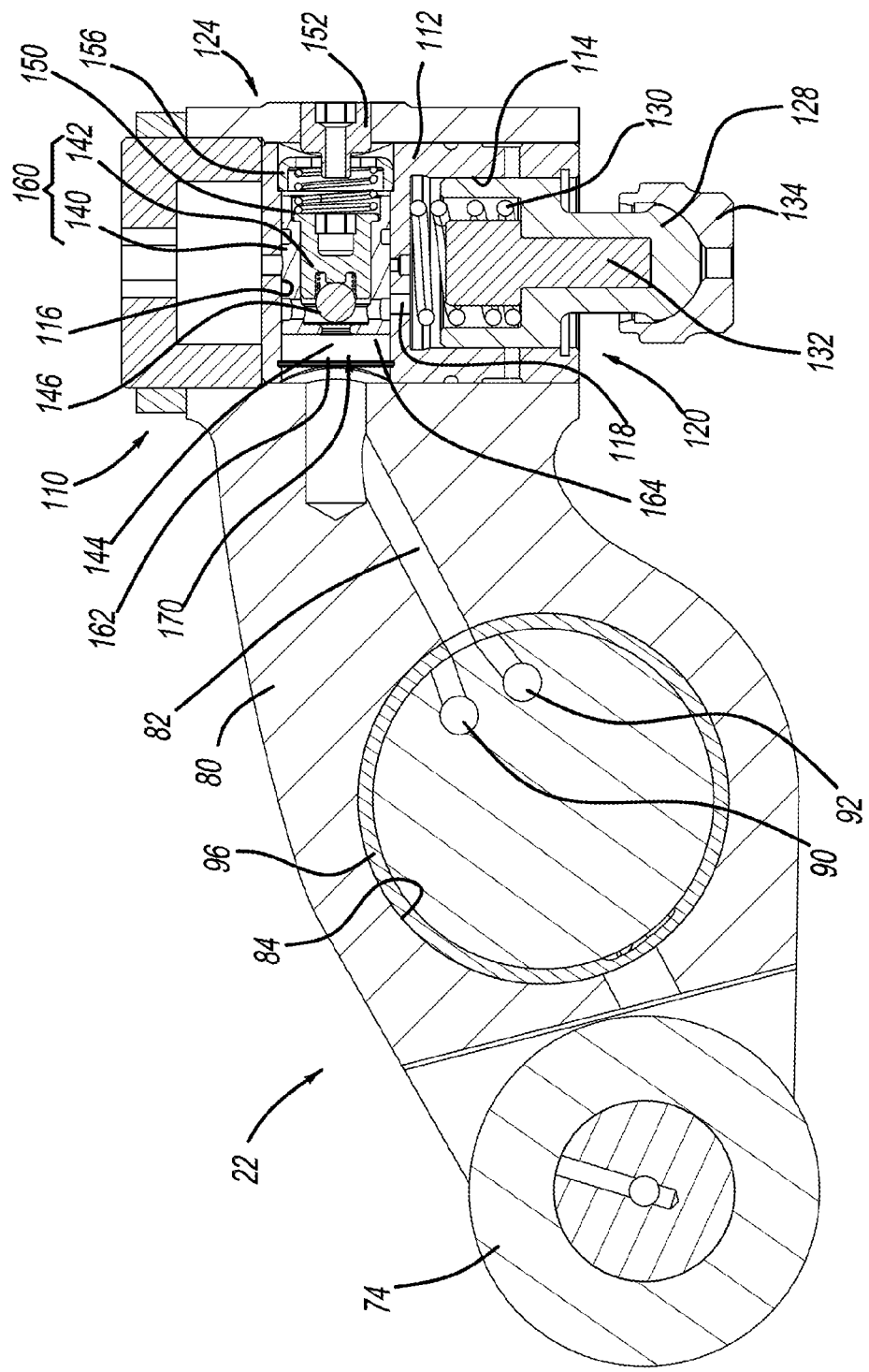
FIG. 11 is a sectional view of a rocker arm assembly constructed in accordance to the present disclosure and shown just before a reset function.
Figure 12:
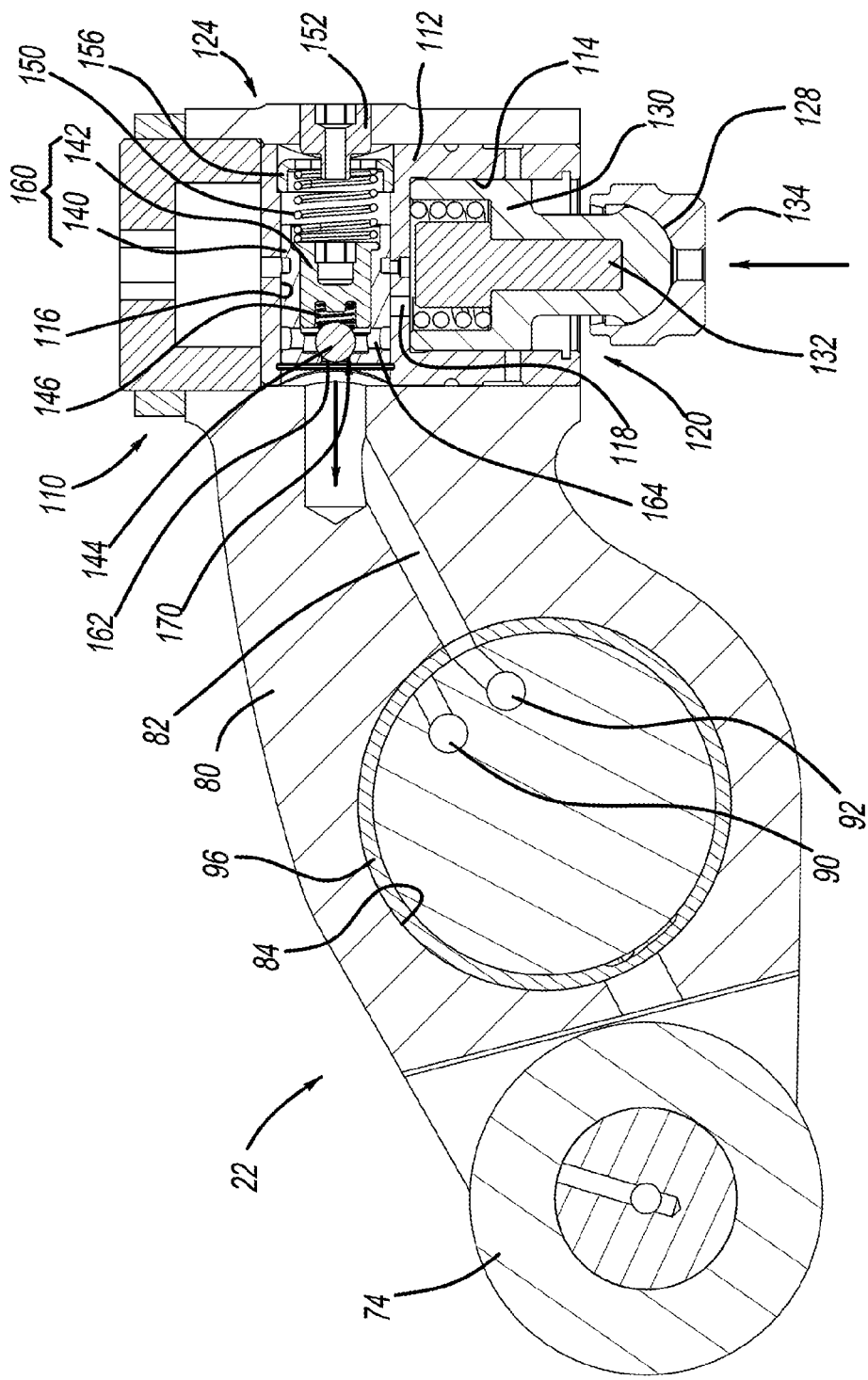
FIG. 12 is a sectional view of a rocker arm assembly constructed in accordance to the present disclosure and shown just after the reset function.
Figure 13:
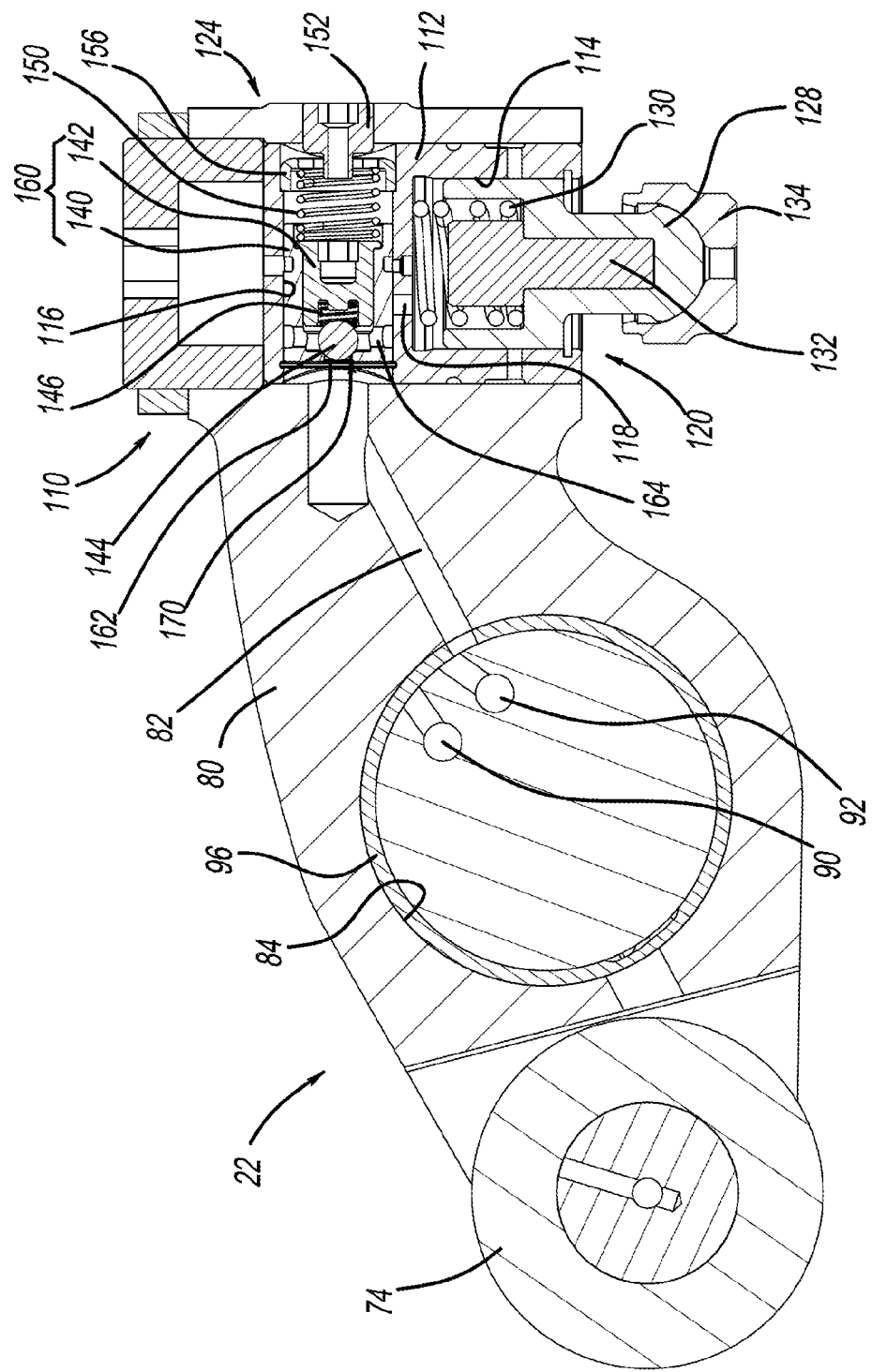
FIG. 13 is a sectional view of a rocker arm assembly constructed in accordance to the present disclosure and shown during the reset function.

7), from the bias of the shuttle biasing member 150. The plunger 128 is then free to move to a retracted position (plunger chamber 114 is no longer pressurized). In this regard, the lift profile transitions from the solid line to the dashed line (FIG. 7). Upon completion of the reset function, (identified by "FIG. 12" in FIG. 7), the shuttle assembly 124 remains biased leftward by the shuttle biasing member 150 and the valve lift can follow a standard exhaust lift profile. For rocker arms configured for engine brake and early exhaust valve opening, the oil control valve would be upstream of the capsule assembly 110 controlling oil flow into the capsule assembly 110. For early and late intake valve closing, the oil control valve would be downstream controlling oil flow from the capsule.

Figure 14:
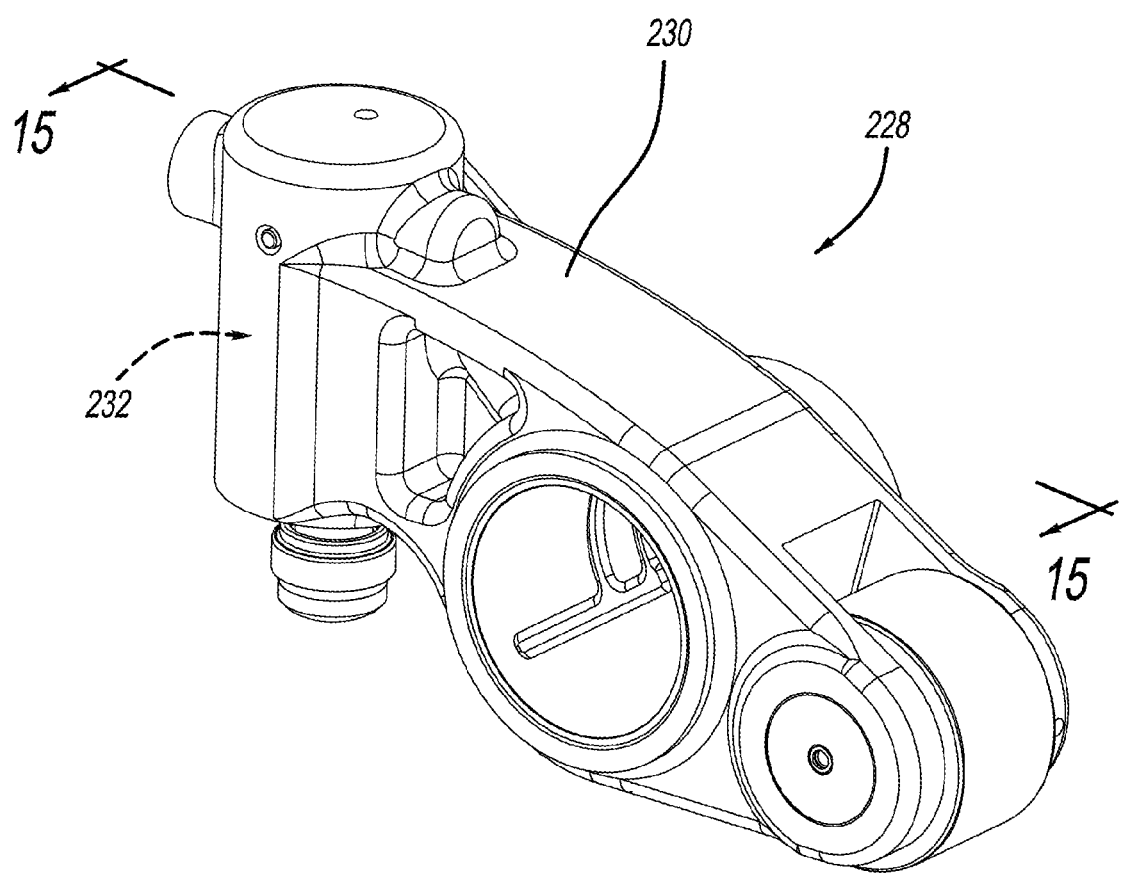
FIG. 14 is a front perspective view of a rocker arm assembly constructed in accordance to another example of the present disclosure.
Figure 15:
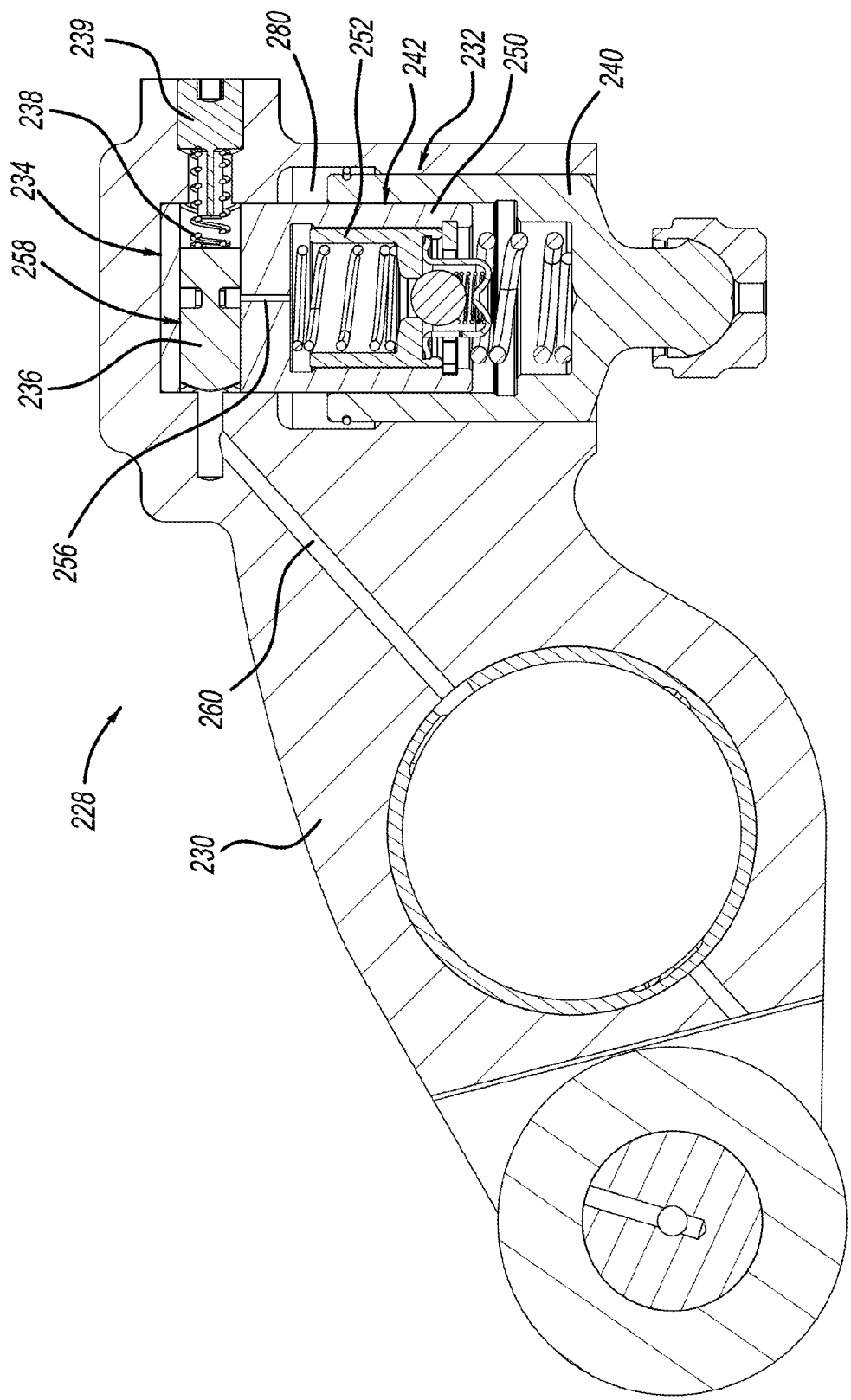
FIG. 15 is a sectional view along lines 15-15 of the rocker arm assembly of FIG. 14.

With reference now to FIGS. 14 and 15, a rocker arm assembly according to another example of the present disclosure is shown and generally identified at reference numeral 228. The rocker arm assembly 228 is configured as an exhaust rocker arm and has a rocker arm 230 that incorporates a hydraulic lash adjuster (HLA) or capsule assembly 232 and a shuttle or spool assembly 234. The spool assembly 234 has a spool 236, a biasing member 238 and a plug 239. The capsule assembly 232 includes an HLA or outer body 240 and an inner body assembly 242. The inner body assembly 242 includes a plunger assembly having an outer plunger 250 and an inner plunger 252. In drive mode a passage 256 is left open and the capsule assembly 232 becomes solid and a spool valve 258 of the spool assembly 234 is opened, in braking mode, oil is delivered to the actuation channel 260 causing the spool 236 to translate and seal the passage 256. The capsule assembly 232 becomes solid.

At a certain point of rotation of the rocker arm 228 the pressurized oil is no longer pressurized at the spool 236 and the oil can be pushed out of the actuation channel 260 by the spring 238. Oil in the chamber of the capsule assembly 232 is allowed to discharge. Explained further, the inner plunger 252 collapses and engages the outer plunger 250. In one non-limiting configuration, the inner plunger can collapse 2.35 mm. This is the point that a reset function similar to described above occurs.

When the spool 236 is translating left and right, oil has the ability to replenish the capsule assembly 232. A check valve 270 is disposed in the rocker arm 230 and selectively connects the actuation channel 260 to the chamber associated with the inner plunger 252. When the outer body 240 is urged upward, oil in high pressure (plunger) chamber 280 can be displaced. In one configuration, oil is displaced causing 2.35 mm of motion of the outer body 240 in the high pressure chamber 280 and 4 mm of motion of the inner plunger 252 in the inner chamber 282.

During operation, when the rocker arm 230 is following the base circle, the inner plunger 252 is in the bottom position in the inner chamber 282. The outer body 240 is in the working position. In the braking mode, the spool valve 258 is closed and both chambers 280 and 282 are closed or sealed. When in drive mode, the inner plunger 252 collapses (moves upward) as the high pressure volume moves it upwards, in braking mode, the spool valve 258 opens in predetermined position, discharging oil from the chamber 280 allowing the reset function. Very similar hardware can be incorporated on the intake side to achieve further benefit of intake valve closing.

Figure 16:
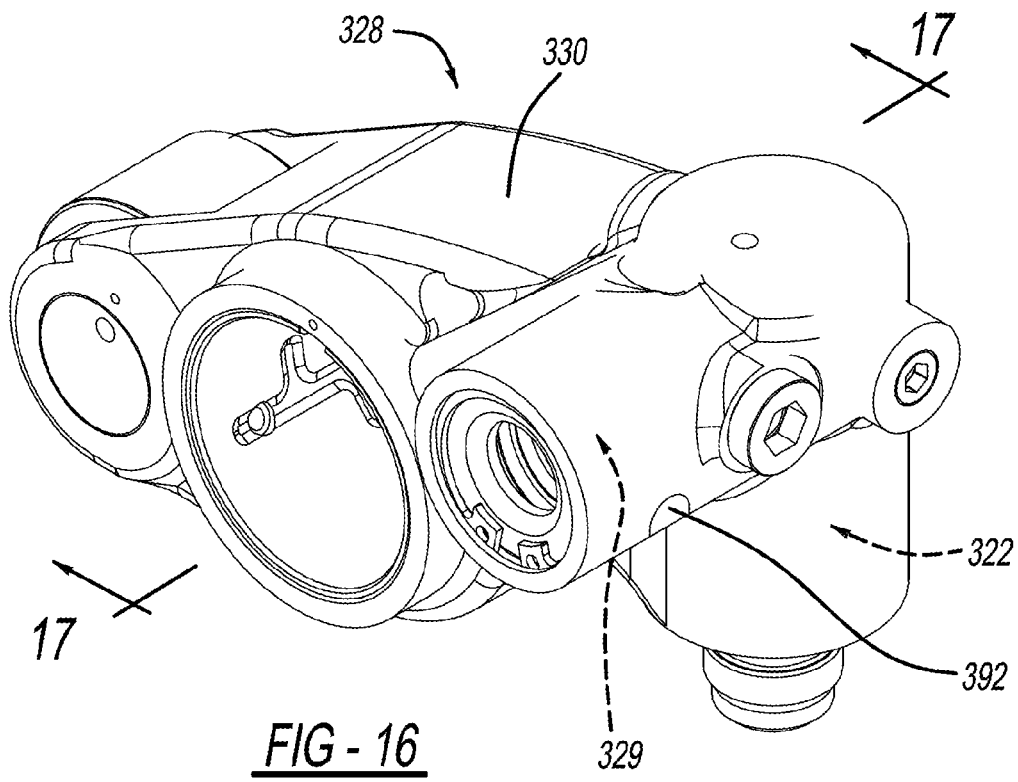
FIG. 16 is a perspective view of a rocker arm assembly incorporating an accumulator according to another example of the present disclosure.
Figure 17:
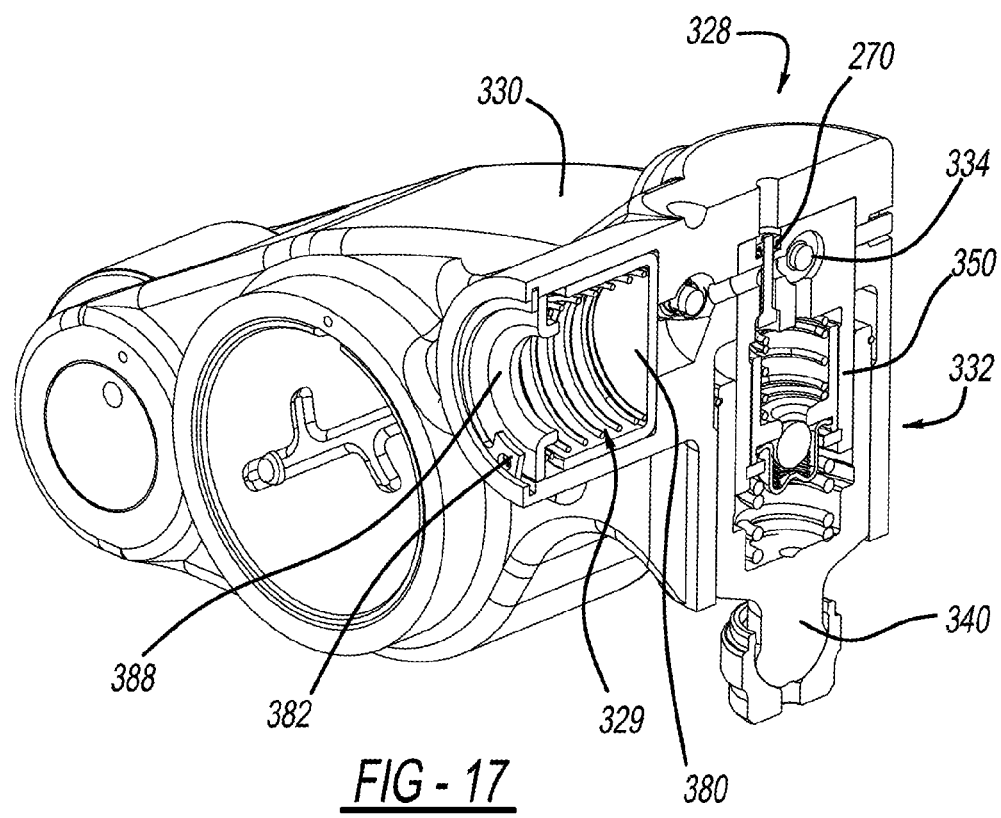
FIG. 17 is a sectional view along lines 17-17 of FIG. 16.
Figure 18:
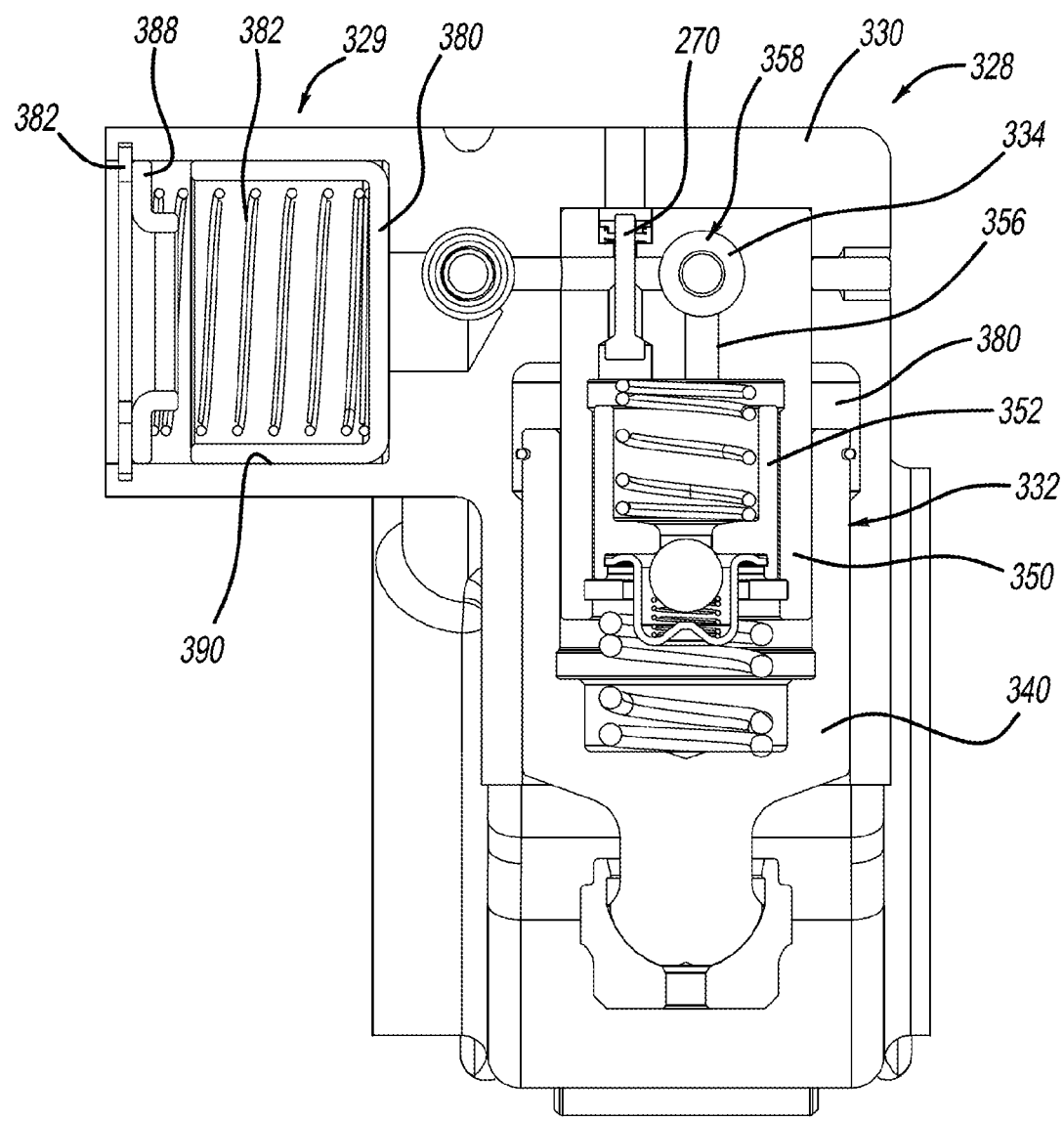
FIG. 18 is a detail view of the view shown in FIG. 17.

With reference now to FIGS. 16-18, a rocker arm assembly according to another example of the present disclosure is shown and generally identified at reference numeral 328. The rocker arm assembly 328 is configured similar to the rocker arm assembly 228 but further incorporates an accumulator 329. The rocker arm assembly 328 is configured as an exhaust rocker arm and has a rocker arm 330 that incorporates a hydraulic lash adjuster (HLA) or capsule assembly 332 and a shuttle or spool assembly 334. The spool assembly 334 can be constructed similar to the spool assembly 234 described above. The capsule assembly 332 includes an HLA or outer body 340 and an inner body assembly 342. The inner body assembly 342 includes an outer plunger 350 and an inner plunger 352.

In drive mode a passage 356 is left open and the capsule assembly 332 becomes solid and a spool valve 358 of the spool assembly 334 is opened. In braking mode, oil is delivered to the actuation channel 360 causing the spool 336 to translate and seal the passage 356. The capsule assembly 332 becomes solid. The accumulator 329 can include an accumulator piston 380, an accumulator spring 382, an accumulator snap ring 384 and an accumulator washer 388. The accumulator piston 380 slidably translates within a piston housing 390 that defines a release hole 392. The piston housing 390 provides additional oil volume on the rocker arm 330. The accumulator piston 380 is configured to accumulate a limited amount of oil. Beyond the predetermined amount, any additional oil volume generated will push the accumulator piston against the bias of the accumulator spring 382 until translating beyond the release hole 392. This additional oil is released through the release hole 392.

The foregoing description of the examples has been provided for purposes of illustration and description. It is not intended to be exhaustive or to limit the disclosure, individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A rocker arm assembly configured for use in a valve train carrier, the rocker arm assembly being rotatable around a rocker shaft supported by the valve train carrier based upon a lift profile provided on a cam that rotates with a camshaft, a rotation of the rocker arm assembly causing translation of a corresponding engine valve, the rocker arm assembly comprising:
   a rocker arm body having an opening that receives the rocker shaft, the rocker arm body further defining an oil supply channel;
   a capsule assembly disposed on the rocker arm body and configured to selectively communicate oil to and from the oil supply channel, the capsule assembly comprising:
      a plunger assembly having a plunger configured to selectively translate within a plunger chamber between an extended rigid position based upon the plunger chamber being pressurized with oil and a retracted non-rigid position based upon the plunger chamber being depressurized, the plunger being configured to move the engine valve toward an open position; and
      a shuttle assembly configured to move between a first position and a second position based upon oil communicated in the oil supply channel, the shuttle assembly having a shuttle valve configured to selectively move between a closed position and an open position, wherein in the open position oil flows into the plunger chamber, and
   wherein the rocker arm assembly is configured to sequentially move along a (i) a first valve lift profile wherein pressurized oil is communicated from the oil supply channel, the shuttle assembly being configured to move into the second position causing the shuttle valve to be opened, the plunger chamber to be pressurized, and the plunger to move to the extended rigid position, (ii) a reset valve lift profile wherein pressurized oil is not communicated from the oil supply channel, the shuttle assembly being configured to move into the first position, and (iii) a valve closing profile.

2. The rocker arm assembly of claim 1, wherein the shuttle assembly is configured to move into the second position based on the oil supply channel of the rocker arm body being aligned with an actuation oil supply channel on the rocker shaft.

3. The rocker arm assembly of claim 2, wherein the shuttle assembly is configured to move into the first position based on the oil supply channel of the rocker arm body being aligned with a reset discharge channel on the rocker shaft.

4. The rocker arm assembly of claim 1, wherein the rocker arm assembly comprises an exhaust rocker arm assembly, and
   wherein the first valve lift profile includes decompression engine braking.

5. The rocker arm assembly of claim 4, wherein the engine valve comprises an exhaust engine valve, the exhaust engine valve being configured to (i) move through exhaust gas recirculation, (ii) almost close, and (iii) move through compression release along the first valve lift profile.

6. The rocker arm assembly of claim 5, wherein the valve closing profile corresponds to a standard exhaust valve closing profile.

7. The rocker arm assembly of claim 1, wherein the rocker arm assembly comprises an exhaust rocker arm assembly, and
   wherein the first valve lift profile includes early exhaust valve opening.

8. The rocker arm assembly of claim 1, wherein the rocker arm assembly comprises an intake rocker arm assembly, and
   wherein the third valve lift profile includes early intake valve closing.

9. The rocker arm assembly of claim 1, wherein the plunger assembly further includes a plunger biasing member configured to bias the plunger toward the extended rigid position.

10. The rocker arm assembly of claim 9, wherein the plunger biasing member comprises a coil spring, and
    wherein the plunger assembly further includes a guide rod positioned axially within the plunger biasing member.

11. The rocker arm assembly of claim 1, wherein the shuttle valve further comprises a shuttle body having an upstream and a downstream shuttle port, a ball, and a ball biasing member, and
    wherein the ball seats against the upstream shuttle port in the closed position.

12. The rocker arm assembly of claim 11, wherein during the first valve lift profile, the ball is configured to move away from the upstream shuttle port to an unseated position fluidly connecting the upstream shuttle port, and the downstream shuttle port.

13. The rocker arm assembly of claim 12, wherein the capsule assembly comprises a capsule housing received by the rocker arm body, the capsule housing defining a plunger chamber, a shuttle chamber, and a connecting port that fluidly connects the plunger chamber and the shuttle chamber.

14. The rocker arm assembly of claim 13, wherein during the first valve lift profile, oil is communicated through the upstream shuttle port, downstream shuttle port, and the connecting port to fill the plunger chamber.

15. A rocker arm assembly configured for use in a valve train carrier, the rocker arm assembly comprising:
    a first exhaust rocker arm assembly rotatable around a rocker shaft supported by the valve train carrier based upon a first lift profile provided on a first cam configured to rotate with a camshaft, a rotation of the first exhaust rocker arm assembly causing translation of a corresponding first engine exhaust valve, the first exhaust rocker arm assembly comprising a first rocker arm body having a first capsule assembly configured to move through a first reset function that changes a lift profile of the first engine exhaust valve;
    a second exhaust rocker arm assembly rotatable around the rocker shaft based upon a second lift profile provided on a second cam configured to rotate with the camshaft, a rotation of the second exhaust rocker arm assembly causing translation of a corresponding second engine exhaust valve, the second exhaust rocker arm assembly comprising a second rocker arm body having a second capsule assembly configured to move through a second reset function that changes a lift profile of the second engine exhaust valve,
    wherein the first exhaust rocker arm assembly is configured for decompression engine braking and the second exhaust rocker arm assembly is configured for early exhaust valve opening.

16. The rocker arm assembly of claim 15, wherein the first and second rocker arm assemblies each comprise:

a rocker arm body having an opening that receives the rocker shaft, the rocker arm body further defining an oil supply channel;

a plunger assembly having a plunger configured to selectively translate within a plunger chamber between an extended rigid position based upon the plunger chamber being pressurized with oil and a retracted non-rigid position based upon the plunger chamber being depressurized, the plunger being configured to move the engine valve toward an open position; and a shuttle assembly configured to move between a first position and a second position based upon oil communicated in the oil supply channel, the shuttle assembly having a shuttle valve configured to selectively move between a closed position and an open position, wherein in the open position oil flows through a downstream shuttle port and into the plunger chamber.

17. The rocker arm assembly of claim 16, wherein the first rocker arm assembly is configured to sequentially move along a (i) a first valve lift profile wherein pressurized oil is communicated from the oil supply channel, the shuttle assembly being configured to move into the second position causing the shuttle valve to be opened, the plunger chamber to be pressurized, and the plunger to move to the extended rigid position, (ii) a reset valve lift profile wherein pressurized oil is not communicated from the oil supply channel, the shuttle assembly being configured to move into the first position, and (iii) a valve closing profile.

18. The rocker arm assembly of claim 16, wherein the shuttle assembly is configured to move into the second position based on the oil supply channel of the respective rocker arm body being aligned with an actuation oil supply channel on the rocker shaft.

19. The rocker arm assembly of claim 18, wherein the shuttle assembly is configured to move into the first position based on the oil supply channel of the respective rocker arm body being aligned with a reset discharge channel on the rocker shaft.

20. The rocker arm assembly of claim 16, wherein the plunger assembly further includes a plunger biasing member configured to bias the plunger toward the extended rigid position.

21. The rocker arm assembly of claim 17, wherein the shuttle valve further comprises a shuttle body having an upstream and the downstream shuttle port, a ball, and a ball biasing member, wherein the ball seats against the upstream shuttle port in the closed position.

22. The rocker arm assembly of claim 21, wherein during the first valve lift profile, the ball is configured to away from the upstream shuttle port to an unseated position fluidly connecting the upstream shuttle port, and the downstream shuttle port.

23. The rocker arm assembly of claim 22, further comprising a capsule assembly having capsule housing received by the respective rocker arm body, the capsule housing defining a plunger chamber, a shuttle chamber, and a connecting port that fluidly connects the plunger chamber and the shuttle chamber.

24. A rocker arm assembly configured for use in a valve train carrier, the rocker arm assembly comprising:

a first exhaust rocker arm assembly rotatable around an exhaust rocker shaft supported by the valve train carrier based upon a first lift profile provided on a first cam configured to rotate with an exhaust camshaft, a rotation of the first exhaust rocker arm assembly causing translation of a corresponding first engine exhaust valve, the first exhaust rocker arm assembly comprising a first rocker arm body having a first capsule assembly configured to move through a first reset function that changes a lift profile of the first engine exhaust valve;

a second exhaust rocker arm assembly rotatable around the exhaust rocker shaft based upon a second lift profile provided on a second cam configured to rotate with the exhaust camshaft, a rotation of the second exhaust rocker arm assembly causing translation of a corresponding second engine exhaust valve, the second exhaust rocker arm assembly comprising a second rocker arm body having a second capsule assembly configured to move through a second reset function that changes a lift profile of the second engine exhaust valve; and an intake rocker arm assembly rotatable around an intake rocker shaft based upon a third lift profile provided on a third cam configured to rotate with an intake camshaft, the rotation of the first intake rocker arm assembly causing translation of at least one engine intake valve, the intake rocker arm assembly comprising a third rocker arm body having a third capsule assembly configured to move through a third reset function that changes a lift profile of the at least one engine intake valve, wherein the first exhaust rocker arm assembly is configured for decompression engine braking, the second exhaust rocker arm assembly is configured for early exhaust valve opening, and the intake rocker arm is configured for one of early intake valve closing or late intake valve closing.

\* \* \* \* \*